G. SAVAGE.
SUN AND RAIN PROTECTOR.
APPLICATION FILED NOV. 16, 1910.

1,018,522.

Patented Feb. 27, 1912.

WITNESSES:
L. H. Schmidt.

INVENTOR
GEORGE SAVAGE,
BY Chas E Brock
ATTORNEY

UNITED STATES PATENT OFFICE.

GEORGE SAVAGE, OF HAMILTON, WASHINGTON.

SUN AND RAIN PROTECTOR.

1,018,522.　　　　　Specification of Letters Patent.　　Patented Feb. 27, 1912.

Application filed November 16, 1910. Serial No. 592,673.

*To all whom it may concern:*

Be it known that I, GEORGE SAVAGE, a citizen of the United States, residing at Hamilton, in the county of Skagit and State of Washington, have invented a new and useful Improvement in Sun and Rain Protectors, of which the following is a specification.

This invention relates to certain new and useful improvements in shelters for protecting laboring-men such as lumber-men and wood-cutters from the rain and sun, the object being to provide a shelter in the form of a collapsible shade which can be readily carried from place to place and set up so as to protect the workmen.

Another object of my invention is to provide a shelter which can be readily converted into a device for operating a saw by simply changing the position of several of the parts, whereby one man can operate a saw in order to cut a tree at any height from the ground.

Another object of my invention is to provide a device which is exceedingly simple and cheap in construction and one in which the main support can be used for various purposes such as a measuring device.

With these objects in view, the invention consists in the novel features of construction, combination and arrangements, of parts hereinafter fully described and pointed out in the claims.

Figure 1:
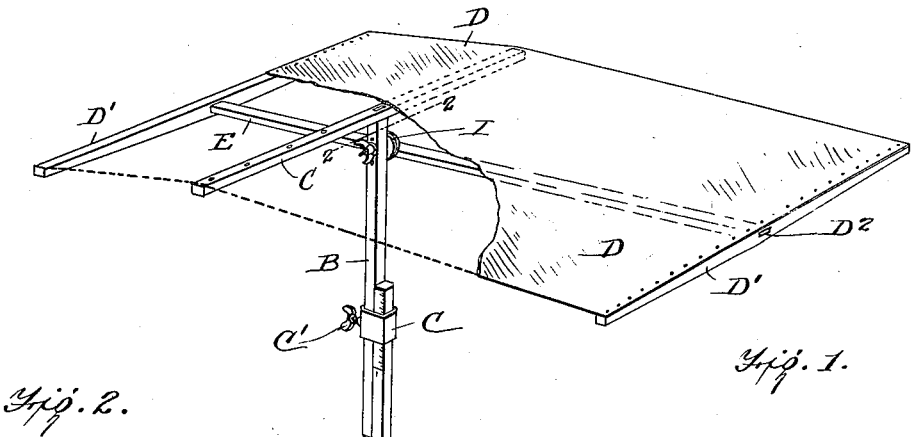
Figure 2:
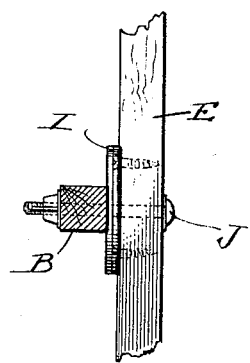
Figure 3:
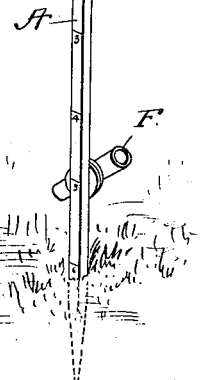
Figure 3:
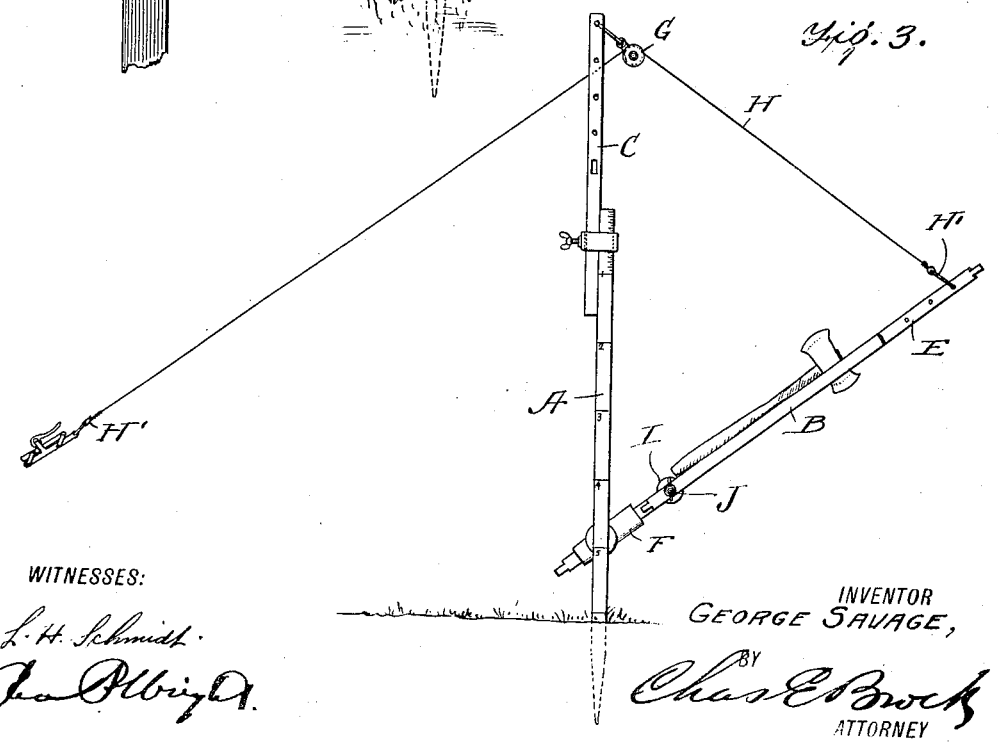

In the drawing forming a part of this specification:—Figure 1 is a perspective view of the device in use as a shelter. Fig. 2 is an enlarged detail view partly in section illustrating a pivot connection. Fig. 3 is a side view of the device with the parts in position for use when sawing.

In constructing the device, I employ a suitable upright A, pointed at the lower end to adapt it to be driven into the ground or it may be placed in a suitable socket, not shown, if desired. Slidably carried by the upright is a vertically arranged bar B, held in position upon the upright A by means of a sleeve or collar C, and adapted to be clamped in its adjusted position by a thumb nut C'. At its upper end the bar B carries a cross bar $C^2$ which forms the rigid pole of a suitable shade or shelter D. The shelter D, which is of any suitable water proof fabric is rectangular in shape and is provided at its ends with end rods D', which are provided midway their ends with suitable sockets $D^2$ into which fit pointed or reduced end portions of a bar E, the said bar E being pivotally connected to the bar B and adapted to swing in a vertical plane for the purpose of adjusting the inclination of the shelter D. The bar E is preferably connected to the bar B at such a point that when swung into a vertical position the lower ends of the two bars will be flush with each other, for the purpose to be hereafter described. The two bars are slightly spaced apart by means of a suitable disk or washer I, which also forms a bearing plate for the bar E to swing upon, the two bars being secured together by a bolt J, which passes through the bars and through the washer I, and a suitable nut of any kind works upon said bolt. Upon one side of the upright A is arranged a pivoted socket F, which is adapted to receive the ends of both the bars B and E.

When the device is to be used as a shelter for protection against rain or sun the bar B is clamped to the upright A by means of the collar C and the nut C', as shown in Fig. 1 and the shelter D is stretched over the cross bar $C^2$ with the end rods in engagement with the end portions of the bar E as shown. But the device is also intended to take the place of one man in working a cross cut saw. Especially when the said saw is to be operated in a horizontal plane for the purpose of sawing off stumps or felling timber. Usually two men are required to handle such a saw, one man at each end. By means of my device, I am able to dispense with the extra man thus enabling a single man to handle a saw of this kind to advantage. When the device is to be so used the bar B is removed from the clamp C and the bar $C^2$ substituted therefor. The bar E is folded or brought parallel to the bar B so that two ends of said bars will coincide and said ends are then inserted in the socket F, as shown in Fig. 3. A pulley G is hung from the upper end of the bar $C^2$ and a cable H is run over said pulley and said cable is provided with suitable hook members H' at each end, one of which engages the upwardly projecting end portion of the bar E, while the other hook member H' is designed to be secured in any suitable manner to one end of the ordinary cross cut saw. In order to weight the bars B and E an ax or any other piece of metal, such as wedges, may be inserted in the space between the said bars, the washer I spacing the said bars apart for this purpose. It will be obvious that with the parts so arranged and connected the operator by grasping the other end of the saw will upon drawing the same in his direction or toward him lift the bars B and E and the weight carried by them. Upon reaching the end of the stroke or cut in the direction of the operator the weight of the bars B and E and the ax or wedges will exert a pull upon the cable H which will tend to draw the saw in the opposite direction, this device therefore taking the place of one man at one end of the saw.

As the saw is of the ordinary cross cut form and forms no part of the invention the same has not been illustrated but it is believed that the operation will be clear from the above description.

What I claim is:—

1. A device of the kind described comprising an upright adapted to be driven into the ground, a bar carried by said upright and vertically adjustable, a cross bar carried by the said vertically adjustable bar, a fabric adapted to be stretched over said cross bar, end rods carried by the fabric, and a bar pivotally connected to the first mentioned bar and adapted to engage the end rods carried by the fabric.

2. In a device of the kind described, an upright, a vertically adjustable bar carried by said upright, a second bar pivotally connected to one side of the first mentioned bar, the point of connection being at an equal distance from an end of each bar, a shelter adapted to be carried by the second mentioned bar, and a pivoted socket carried by the upright and adapted to receive the ends of both bars.

GEORGE SAVAGE.

Witnesses:
E. F. EICHHOLTZ,
H. J. WEAVER.